R. M. LOVEJOY.
WORM GEARING.
APPLICATION FILED SEPT. 25, 1915.
1,276,237.
Patented Aug. 20, 1918.
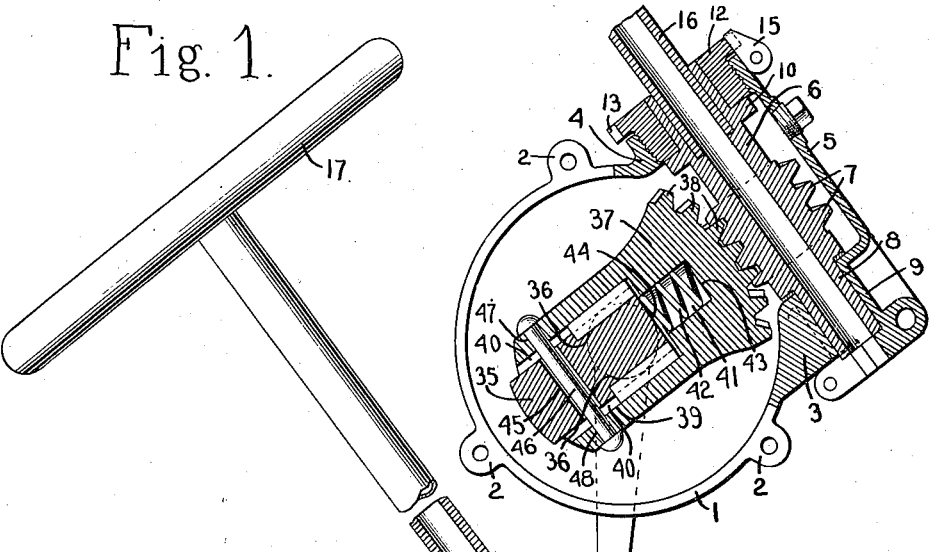
Fig. 3.
Fig. 1.
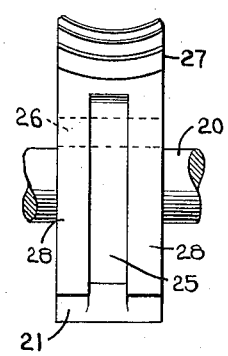
Fig. 2.
Inventor.
Ralph M. Lovejoy
by Heard Smith & Dunant
Attys

UNITED STATES PATENT OFFICE.

RALPH M. LOVEJOY, OF MEREDITH, NEW HAMPSHIRE.

WORM-GEARING.

1,276,237.

Specification of Letters Patent. Patented Aug. 20, 1918.

Application filed September 25, 1915. Serial No. 52,701.

*To all whom it may concern:*

Be it known that I, RALPH M. LOVEJOY, a citizen of the United States, and resident of Meredith, county of Belknap, State of New Hampshire, have invented an Improvement in Worm-Gearing, of which the following description, in connection with the accompanying drawing, is a specification, like characters on the drawing representing like parts.

This invention relates to improvements in worm gearing and particularly such as is utilized in the steering gear of automobiles and like machines in which rotation of the steering wheel and stem is transmitted through a worm gear to a transversely extending rock shaft or steering shaft, and from the latter to suitable mechanism for directing the wheels.

In order to provide means which will permit the vehicle to be turned in a relatively small space it is necessary to provide a gear segment which may be adjusted through a relatively large angle.

In ordinary operation however, where the vehicle is guided in a substantially straight course the angular movement imparted to the gear is very slight, as a consequence the wear in the gear teeth is mainly limited to the central portion of the segment and the wear in the worm is likewise mainly upon a small amount of the circumference of the worm so that in use the wear upon the worm and upon the worm gear in these practically constantly intermeshing sections is so great as to result in lost motion and in the consequent rattling between the worm and the worm gear.

It is desirable to provide means for compensating for wear thus caused in order that the mechanism will respond quickly to any movement of the steering wheel and also to avoid rattling. Furthermore in the construction of gears which are hardened after having been cut there is frequently a small amount of warping which renders the intermeshing surfaces inaccurate and it is desirable to provide means for compensating for inaccuracies thus produced.

The present invention contemplates the provision of intermeshing members which are yieluably maintained in intimate engagement in such a manner as to prevent or take up lost motion and also to maintain such relation of the parts that relative rotation of one member will cause immediate responsive rotation in the other member.

The invention is disclosed herein as applied to the steering gear of an automobile in which a worm is mounted upon the stem of the steering wheel and engages a segment which is pivotally mounted upon a member fixed to the steering shaft of the machine, resilient means being interposed between said member and said segment in such position as constantly to force the teeth of the gear into intimate engagement with the threads upon the worm.

A further feature of the invention is to provide means for preventing an undue radius of movement of said worm gear so that the worm may be removed and replaced readily.

Other features of the invention will more fully appear from the following description, the accompanying drawings and will be particularly pointed out in the annexed claims.

Figure 1 is a view partly in section of the supporting mechanism of an automobile embodying a preferred form of my invention, Fig. 2 is a detail view of the gear segment showing the bifurcated extension which coöperates with the member upon which the gear segment is mounted to limit its movement under the action of the spring, Fig. 3 is a view similar to Fig. 1 disclosing a different specific construction adapted for the same purposes.

As illustrated in the drawing the steering mechanism comprises a two part cylindrical casing 1 each member having ears 2 by means of which the sections may be bolted together. The casing preferably may be provided with extensions or brackets 3 and 4 adapted to form bearings or spaces for the bushings forming the journals for the stem of the worm gear. A shell 5 preferably formed integral with the brackets 3, 4 and the casing 1 forms an oil tight housing adapted to contain the steering mechanism which will hereinafter be described.

The worm gear preferably comprises a hollow shaft 6 having at its intermediate portions threads 7 and its lower end reduced to form a shaft 8 which is rotatably mounted in bearings 9 in the bracket 3. At its upper end the shaft 6 desirably may be provided with a flange 10 and beyond the flange with a reduced portion adapted to fit rotatably in a bushing 12 adjustably seated in the bracket 4.

The bushing 12 desirably is provided with a toothed flange 13 and the bracket with a pawl 15 pivotally mounted thereupon adapted to engage the teeth in the flange 13 to retain the bushing in adjusted position. The lower face of the bushing 12 engages the upper surface of the flange 10 upon the shaft 6 and maintains the worm shaft from longitudinal movement, the bushing 12 being of sufficient size to permit the withdrawal of the shaft 6 and its worm 7.

The upper end of the shaft 6 preferably is recessed and the stem 16 leading to the steering wheel 17 is rigidly secured therein so that the rotation of the steering wheel will cause the rotation of the worm.

In the usual types of steering gear the worm engages an entire gear or a segment of a gear secured upon a steering shaft which is usually a rock shaft connected by suitable mechanism to the front axle of the vehicle. Since in the driving of automobiles the angular adjustment of the steering mechanism is relatively slight while the vehicle is guided in substantially a straight course a greater amount of wear takes place upon a small section of the segmental gear and also upon a relatively small portion of the worm.

Means have heretofore been devised for relatively adjusting the steering shaft and worm shaft toward and from each other to compensate for such wear but when such adjustment is made the gears are brought so closely together that a great strain is placed upon the gearing if the same is turned beyond the worn portions in either direction. Furthermore the amount of adjustment of this character is exceedingly limited.

As before stated one of the principal objects of the present invention is to provide a segmental gear of such character that teeth will be maintained constantly in intimate contact with the threads of the worm notwithstanding the wear but will be of sufficient resilience to permit the engagement of the teeth beyond the zone of the worn teeth without binding, so that the steering mechanism may be operated through its entire amplitude of movement with substantially the same resistance at the end while thus making the governing of the vehicle more certain.

In the mechanism disclosed herein the steering shaft 20 is journaled in bearings centrally disposed in the opposite end walls of the cylindrical casing 1 a gear supporting member 21 being rigidly secured to said shaft in any suitable manner, for example as by a key or other suitable means.

In the preferred form of invention illustrated herein the gear supporting member 21 is in the form of a plate having an outer curved surface 22 concentric with the cylindrical casing and cut away to present flat faces 23—24 lying substantially at right angles to each other.

An extension or bracket 25 projects from the faces 24 and is provided adjacent its outer end with a pivot 26 for the gear segment 27. The gear segment preferably is substantially a quadrant having a bifurcated extension 28 which straddles the extension 25 of the gear supporting member, said bifurcated extension having faces 29 which lie in parallelism with the faces 24 upon the segment supporting member. The gear segment 25 likewise is cut away to present a face 30 preferably parallel or substantially parallel to the faces 23 of the gear supporting member 21. By reason of this construction the segmental gear 27 is capable of movement upon its pivot 26, said movement however being limited by the engagement of the face 29 upon the extension with the face 24 upon the gear supporting member, or if moved in the opposite direction will be limited by the engagement of the face 30 upon the gear segment with the face 23 upon the gear supporting member.

It will be obvious that by reason of this movability of the gear segment, means may be provided for so adjusting the same as to retain its teeth in intimate contact with the worm notwithstanding the wear between the same and if resilient means be provided for maintaining such contact the proper relation of the gears will be maintained at all times whether the wear occurs through a portion or the whole of the intermeshing surface of the gear and worm.

A convenient means for maintaining this constant engagement as illustrated in the drawing comprises a helical spring 31 seated in an aperature 32 in the gear supporting member 21 having its outer end bearing against the flat face 30 of the segmental gear 27 at a point near the end of the segmental gear. This spring may, of course, be of any desired strength, and should be of such strength as to hold the teeth of the segment in contact with the thread of the worm at all times so that the same is prevented from rattling.

In order to assist in assembling the apparatus the gear supporting member 21 desirably is provided with a cut away portion 33 adapted to receive a stud 34 or a lug in the casing, the cut away portion 33 being sufficient to permit the necessary amplitude of movement of the gear segment but adapted to prevent the rotation of the gear to such a position that it cannot be engaged by the worm when the same is introduced.

It will be obvious therefore that inasmuch as the rotation of the gear supporting member within the casing is limited and since the pivotal movement of the gear segment relatively to the gear supporting member is limited by the positions of its faces 29, 30 to the faces 24, 23 of the gear supporting member the teeth of the gear 27 will always be in position to be engaged by the thread of the worm 7 so that in assembling it is merely necessary to insert the end of the worm shaft 8 into the casing until the worm engages the teeth of the gear segment then rotate the worm until the end 8 of the worm shaft is seated in its bearing 9. The bushing 12 may thereupon be screwed into place so as to prevent longitudinal movement of the worm shaft and locked in such position by the pawl 15.

Fig. 3 illustrates a modified form of my invention which is somewhat simpler in construction than that heretofore described. The construction disclosed in Fig. 3 comprises the same form of casing 1 with extensions or brackets 3—4 and casing 5, the worm shaft 6 carrying the worm 7 being mounted in bearings 9, 12 in the manner heretofore described. In this form of construction however the steering shaft 20 is provided near one end with a preferably substantially rectangular block 35 which conveniently may be formed integral with the shaft by drop forging. This block may be planed on its opposite sides to form parallel bearing surfaces and preferably is provided centrally of each side with slots 36 forming keyways. In this construction the segmental gear member 37 comprises a suitable plate having teeth 38 upon its face engaging the worm 7, the segmental plate 37 being provided at the opposite end from the toothed end with a rectangular recess or slot 39 to receive the block 35. This slot preferably is milled in the plate 37 and can be accurately formed so as to provide a running fit between the inner walls of the slot and the sides of the block 35.

The walls of the slot preferably are milled longitudinally to form keyways 40 adapted in coöperation with the keyways 36 in the block 35 to embrace a suitable key and thereby provide a sliding engagement between the block 35 and the gear segment. The gear segment 37 is bored radially to provide a cylindrical aperture 41 to receive a helical spring 42, one end of the said spring being seated against the end wall 43 of said aperture and the other end of the spring upon the face 44 of the block 35 so that the spring tends to force the gear segment 37 firmly into engagement with the threads 7 of the worm to maintain it firmly in contact therewith notwithstanding any wear which may occur upon the teeth of the segment or the worm. By reason of this construction rattling is entirely prevented and a proper engagement between the teeth of the segment and the worm maintained at all times.

In order to prevent the gear segment from dropping off of the block 35 when the worm is removed an aperture 45 may be drilled transversely of the block 35 and a bolt or rod 46 may extend through apertures 47, 48 in the gear segment 37 in alinement with the aperture 45, the aperture 45 being made sufficiently larger than the bolt or rod to permit the movement of the gear segment necessary to compensate for wear. The aperture, however, should not be large enough to permit disengagement of the teeth of the segment from the worm since if such disengagement were permitted a slipping of the gears might occur which would cause the driver to lose control of the steering mechanism.

It will be obvious that this construction is of a simple character and adapted to be readily constructed by the usual milling and planing machines without the necessity of providing special jigs, etc.

It will be understood that the particular embodiment of the invention disclosed herein is illustrative merely and is not restrictive, that the segmental gear instead of being pivotally mounted may be slidably mounted and other forms of adjustable or resilient means utilized to maintain the gear teeth in contact with the worm and that various mechanical changes may be made within the spirit and scope of the following claims. It will also be understood that this invention is not limited in its application to steering apparatus but is broadly adapted for use in gearing in which one portion of the gearing is subject to greater wear than others.

Having thus described my invention what I claim as new and desire to secure by Letters Patent is;

1. A worm gearing comprising a worm, a coöperating rotatable member having a gear segment adapted to engage said worm, a spring for forcing the gear segment into intimate contact with the threads of the worm and means for preventing undesirable displacement of the segment relatively to said rotatable member upon the removal of the worm from engagement with said segment.

2. In a steering gear or controlling device, a steering shaft, a member rigidly secured thereon, a gear segment slidably mounted upon said member, a worm engaging said segment and a spring interposed between said member and said gear segment adapted to maintain the gear teeth in intimate contact with the threads of the worm and means for preventing disengagement of the teeth of said gear segment from said worm.

3. In a steering gear or controlling device, a steering shaft, a rectangular member integral therewith and having parallel guiding faces, a gear segment having a slotted portion engaging and slidably keyed upon said member, guiding means for causing said gear segment to retain the same angular position in respect to said shaft, a worm engaging said segment and a spring seated between said member and said gear segment adapted to maintain the gear teeth in intimate contact with the threads of the worm and means for preventing disengagement of said gear segment from said worm.

4. In a steering gear or controlling device, a steering shaft, a rectangular member rigid therewith having a key secured thereto, a gear segment slidably mounted upon the said rectangular member and slotted to provide a key way for said key, a worm shaft disposed at right angles to the axis of said steering shaft, a worm on said shaft engaging the teeth of said gear segment, a helical spring seated in a recess in said gear segment and bearing upon said member adapted to maintain the gear teeth in intimate contact with the worm.

5. In a steering gear or controlling device, a steering shaft, a rectangular member rigid therewith, a gear segment slidably mounted upon the said rectangular member, a worm shaft disposed at right angles to the axis of said steering shaft, a worm on said shaft engaging the teeth of said gear segment and a helical spring seated in a recess in said gear segment and bearing upon said member exerting pressure in the direction of the radius of said segment adapted to maintain the gear teeth in intimate contact with the threads of the worm and means for limiting the movement of the gear segment relative to said rectangular member by reason of the influence of said spring.

6. A steering gear or controlling device comprising a steering shaft, a rectangular member rigid therewith having keys secured thereto, a gear segment slotted from the end opposite the teeth to fit slidably said rectangular member, a radial recess extending farther into the gear from the bottom of said slot, a spring in said recess engaging said rectangular member, a gear casing surrounding said gear segment, a worm mounted in bearings in said casing engaging said gear segment whereby said spring will maintain the teeth of said gear in engagement with the threads upon the worm.

In testimony whereof, I have signed my name to this specification.

RALPH M. LOVEJOY.